United States Patent
King (10) Patent No.: US 8,348,322 B2
(45) Date of Patent: Jan. 8, 2013

(54) VEHICLE HAVING UTILITY BED AND SEAT

(75) Inventor: Darin D. King, Raymond, OH (US)

(73) Assignee: Honda Motor Co., Ltd., Tokyo (JP)

(*) Notice: Subject to any disclaimer, the term of this patent is extended or adjusted under 35 U.S.C. 154(b) by 177 days.

(21) Appl. No.: 13/017,565

(22) Filed: Jan. 31, 2011

(65) Prior Publication Data

US 2012/0193932 A1    Aug. 2, 2012

(51) Int. Cl.
    *B60P 3/42* (2006.01)
(52) U.S. Cl. .............. 296/24.33; 296/24.43; 296/183.2; 296/64; 296/65.09
(58) Field of Classification Search .............. 296/24.33, 296/24.43, 26.1, 183.1, 183.2, 37.6, 64, 66, 296/65.05, 65.09
    See application file for complete search history.

(56) References Cited

U.S. PATENT DOCUMENTS

| | | |
|---|---|---|
| 3,840,263 A | 10/1974 | Bowden |
| 4,400,013 A | 8/1983 | Imai |
| 4,480,868 A | 11/1984 | Koto |
| 4,750,778 A | 6/1988 | Hoban |
| 4,813,706 A | 3/1989 | Kincheloe |
| 4,842,458 A | 6/1989 | Carpenter |
| 4,973,082 A | 11/1990 | Kincheloe |
| 5,029,928 A | 7/1991 | Huber |
| 5,044,459 A | 9/1991 | Nishikaji |
| 5,106,121 A | 4/1992 | Boone |
| 5,934,727 A | 8/1999 | Storc et al. |
| 5,979,964 A | 11/1999 | Ban et al. |
| 6,059,499 A | 5/2000 | Bird |
| 6,152,490 A | 11/2000 | Suzuki et al. |
| 6,196,613 B1 | 3/2001 | Arai |
| 6,237,981 B1 | 5/2001 | Selleck |
| 6,416,104 B1 | 7/2002 | Fisher et al. |
| 6,464,279 B1 | 10/2002 | Schambre et al. |
| 6,478,355 B1 | 11/2002 | Van Eden et al. |
| 6,481,772 B1 | 11/2002 | Tenn |
| 6,488,326 B2 | 12/2002 | Wyszogrod et al. |
| 6,517,135 B2 | 2/2003 | de Gaillard |
| 6,557,882 B2 | 5/2003 | Harrington |

(Continued)

OTHER PUBLICATIONS

Black, Melissa Ann, Final Office Action, Notification Date of Jul. 21, 2011; U.S. Appl. No. 12/477,717; Titled: Vehicle Having Utility Bed and Seat; Filed: Jun. 3, 2009; Inventor: David W. Arnold, in its entirety.

(Continued)

*Primary Examiner* — Jason S Morrow
(74) *Attorney, Agent, or Firm* — Ulmer & Berne LLP (57) ABSTRACT

A utility bed includes a bed frame, bed floor, pair of carrier arms, end wall, seat bottom, and seat back. The bed floor includes first and second floor portions. The first floor portion is movably coupled with the bed frame and is movable between cargo support and seating positions. Each carrier arm includes first and second ends. The first end is pivotally coupled with the bed frame such that the carrier arms are pivotable about an axis. The end wall is coupled with the second end of each carrier arm. The seat bottom and seat back are respectively coupled with the first floor portion and the end wall. The carrier arms facilitate movement of the end wall between cargo hauling and seating positions. When the first floor portion and the end wall are in their respective seating positions, the seat back and the seat bottom cooperate to provide a rear seat.

20 Claims, 9 Drawing Sheets

U.S. PATENT DOCUMENTS

| | | | |
|---|---|---|---|
| 6,644,709 B2 | 11/2003 | Inagaki et al. | |
| D498,435 S | 11/2004 | Saito et al. | |
| 6,820,911 B2 | 11/2004 | Furui | |
| 6,837,531 B2 | 1/2005 | Mack et al. | |
| 6,905,159 B1 | 6/2005 | Saito et al. | |
| 6,994,388 B2 | 2/2006 | Saito et al. | |
| 7,159,922 B2 | 1/2007 | Iyoda et al. | |
| 7,364,200 B2 | 4/2008 | Downey | |
| 7,367,616 B2 | 5/2008 | Summerford | |
| 7,416,238 B2 | 8/2008 | Houston | |
| 7,547,057 B2 | 6/2009 | Kim et al. | |
| 7,686,368 B2 | 3/2010 | Ghergheli et al. | |
| 7,735,894 B2 | 6/2010 | King et al. | |
| 7,735,896 B2 | 6/2010 | Kubota | |
| 7,762,621 B2 | 7/2010 | Duller | |
| 7,841,639 B2 | 11/2010 | Tanaka et al. | |
| 8,002,331 B2 | 8/2011 | Bowers | |
| 8,075,040 B2 | 12/2011 | Arnold | |
| 8,087,694 B2 | 1/2012 | Johnson et al. | |
| 2004/0041430 A1 | 3/2004 | Harvey | |
| 2005/0140129 A1 | 6/2005 | Miki et al. | |
| 2005/0264048 A1 | 12/2005 | Collins | |
| 2009/0256388 A1 | 10/2009 | Tanaka et al. | |
| 2009/0322135 A1 | 12/2009 | Ehrhard | |
| 2011/0156421 A1* | 6/2011 | Naruoka et al. | 296/26.1 |
| 2011/0156422 A1* | 6/2011 | Mahara et al. | 296/26.1 |
| 2011/0156423 A1* | 6/2011 | Kawabata et al. | 296/26.1 |
| 2011/0169289 A1 | 7/2011 | Arnold et al. | |
| 2011/0187178 A1 | 8/2011 | King | |
| 2011/0221177 A1 | 9/2011 | Srabstein | |

OTHER PUBLICATIONS

U.S. Appl. No. 12/477,717; Titled: Vehicle Having Utility Bed and Seat; Filed Jun. 3, 2009; Inventor: David W. Arnold, in its entirety.

U.S. Appl. No. 12/646,160; Titled: Vehicle Having Utility Bed and Passenger Restraint Assembly; Filed: Dec. 23, 2009; Inventors: David W. Arnold et al., in its entirety.

U.S. Appl. No. 13/017,529; Titled: Vehicular Utility Bed Having End Wall and Seat Bottom Portion and Vehicles Including Same; Filed Jan. 31, 2011; Inventor: Darin D. King, in its entirety.

Black, Melissa Ann, Non-Final Office Action; Notification Date of Feb. 3, 2011; U.S. Appl. No. 12/477,717; Titled: Vehicle Having Utility Bed and Seat; Filed: Jun. 3, 2009; Inventor: David W. Arnold, in its entirety.

Sliteris, Joselynn Y.; Non Final Office Action, Notification Date of Jun. 19, 2012; U.S. Appl. No. 12/646,160; Titled: Vehicle Having Utility Bed and Passenger Restraint Assembly; Filed: Dec. 23, 2009; Inventor: David W. Arnold, in its entirety.

Inventor: David W. Arnold et al., Notice of Allowance and Fee(s) Due, issued in U.S. Appl. No. 12/646,160, dated Oct. 25, 2012, 24 pages in its entirety.

* cited by examiner

VEHICLE HAVING UTILITY BED AND SEAT

TECHNICAL FIELD

A vehicle includes a frame and a utility bed. The utility bed is coupled with the frame. The utility bed includes an end wall and a floor portion which are each movable to provide a rear seat.

BACKGROUND

Certain conventional vehicles include a utility bed that is suitable to facilitate selective transportation of cargo.

SUMMARY

In accordance with one embodiment, a utility bed comprises a bed frame, a bed floor, a pair of carrier arms, an end wall, a seat bottom, and a seat back. The bed floor comprises a first floor portion and a second floor portion. The first floor portion is movably coupled with the bed frame and is movable with respect to the bed frame between a cargo support position and a seating position. Each carrier arm comprises a first end and a second end. The first end of each carrier arm is pivotally coupled with the bed frame such that the carrier arms are pivotable with respect to the bed frame about a first axis. The end wall is coupled with the second end of each carrier arm. The seat bottom is coupled with the first floor portion. The seat back is coupled with the end wall. The pair of carrier arms facilitates movement of the end wall between a cargo hauling position and a seating position. When the first floor portion and the end wall are in their respective seating positions, the seat back and the seat bottom cooperate to provide a rear seat.

In accordance with another embodiment, a vehicle comprises a vehicular frame, a front seat, and a utility bed. The front scat is coupled with the vehicular frame. The utility bed is coupled with the vehicular frame and comprises a bed frame, a bed floor, a pair of carrier arms, an end wall, a seat bottom, and a scat back. The bed floor comprises a first floor portion and a second floor portion. The first floor portion is movably coupled with the bed frame and is movable with respect to the bed frame between a cargo support position and a seating position. Each carrier arm comprises a first end and a second end. The first end of each carrier arm is pivotally coupled with the bed frame such that the carrier arms are pivotable with respect to the bed frame about a first axis. The end wall is coupled with the second end of each carrier arm. The seat bottom is coupled with the first floor portion. The seat back is coupled with the end wall. The pair of carrier arms facilitates movement of the end wall between a cargo hauling position and a seating position. When the first floor portion and the end wall are in their respective seating positions, the seat back and the seat bottom cooperate to provide a rear seat.

In accordance with yet another embodiment, a vehicle comprises a vehicular frame, a front seat, and a utility bed. The front seat is coupled with the vehicular frame. The utility bed is coupled with the vehicular frame and comprises a bed floor, a pair of carrier arms, a front wall, a seat bottom, and a seat back. The bed floor comprises a front floor portion and a rear floor portion. The front floor portion is pivotally coupled with the rear floor portion and is pivotable with respect to the rear floor portion about a first axis between a cargo support position and a seating position. Each carrier arm comprises a first end and a second end. The first end of each carrier arm is pivotally coupled with the bed frame such that the carrier arms are pivotable with respect to the bed frame about a second axis. The front wall is pivotally coupled with the second end of each carrier arm and pivotable with respect to the pair of carrier arms about a third axis. The seat bottom is coupled with the front floor portion. The seat back is coupled with the front wall. The pair of carrier arms facilitates movement of the front wall between a cargo hauling position and a seating position. The first axis and the second axis are substantially parallel with one another. When the front floor portion and the front wall are in their respective seating positions, the seat back and the seat bottom cooperate to provide a forward facing rear seat.

BRIEF DESCRIPTION OF THE DRAWINGS

Various embodiments will become better understood with regard to the following description, appended claims and accompanying drawings wherein:

DETAILED DESCRIPTION

Embodiments are hereinafter described in detail in connection with the views of FIGS. 1-11, wherein like numbers indicate the same or corresponding elements throughout the views. A vehicle includes a utility bed which can be used to facilitate hauling of cargo by the vehicle. In one embodiment, the vehicle can be a dump-type vehicle having a utility bed that can facilitate selective dumping of cargo from the utility bed. A dump-type vehicle can comprise a light utility vehicle, such as a utility vehicle 10 shown in FIGS. 1-11. In other embodiments, a dump-type vehicle can comprise any of a variety of other types of vehicles having a utility bed capable of dumping (e.g., a dump bed) such as, for example, a pickup truck, a dump truck, an all terrain vehicle ("ATV"), and a golf cart, for example. In another embodiment, the vehicle can include a non-dump type vehicle having a utility bed that is rigidly fixed to the vehicle's frame (e.g., a non-dumpable bed). In yet another embodiment, the vehicle can include a trailer.

Figure 1:
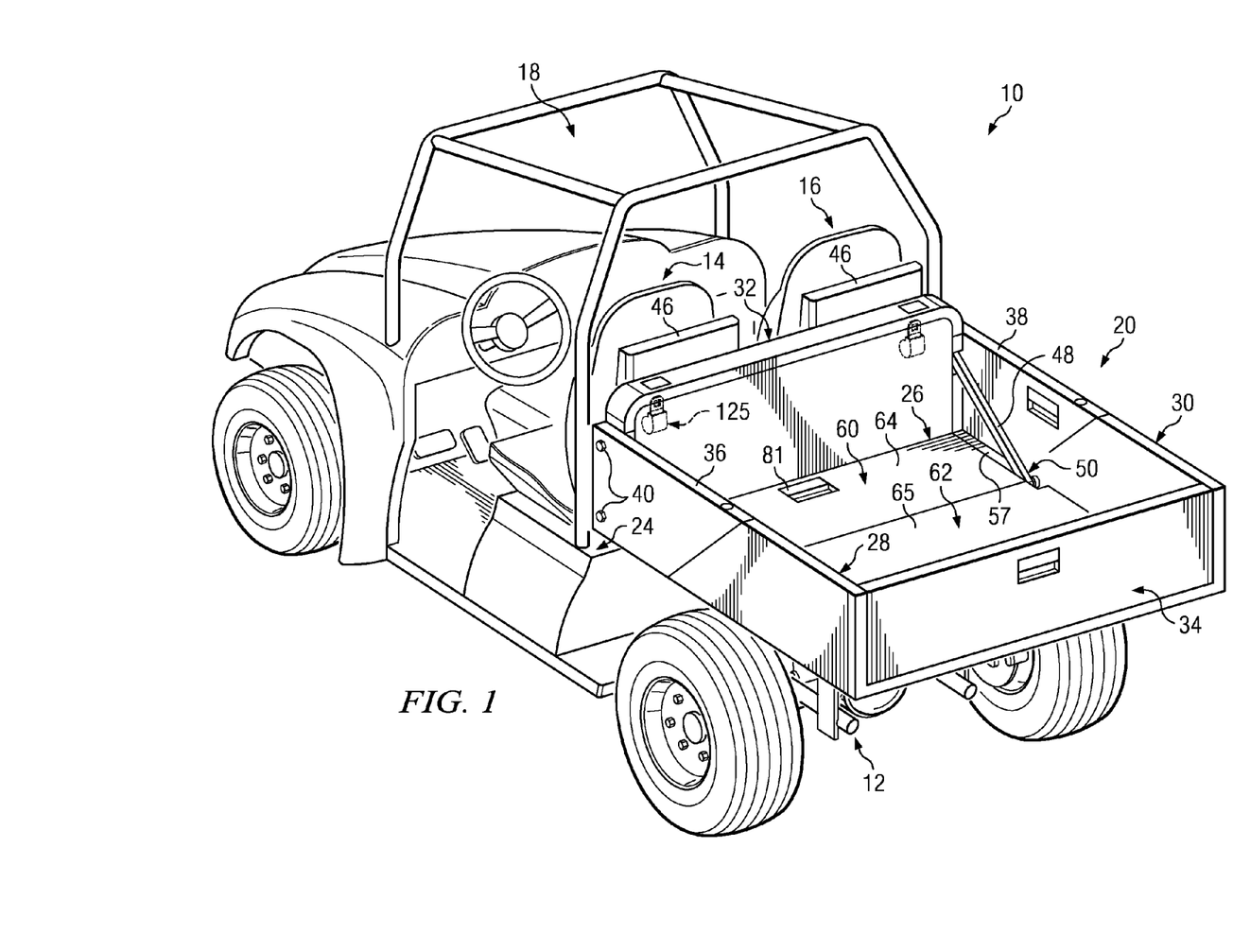
FIG. 1 is a left rear perspective view depicting a vehicle that includes a utility bed.
Figure 2:
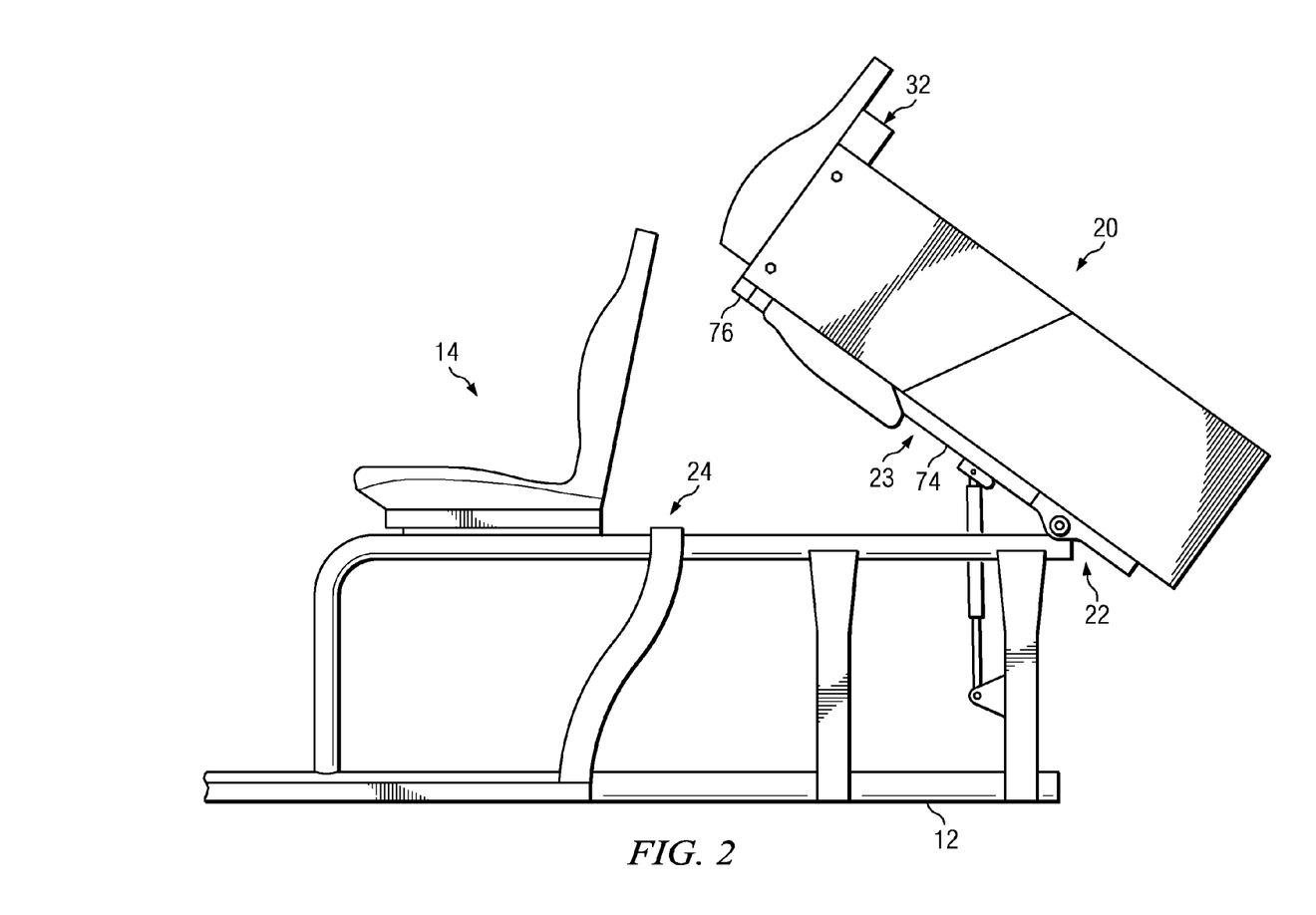
FIG. 2 is a side elevational view depicting the utility bed of FIG. 1 and other various components of the vehicle of FIG. 1, wherein the utility bed is shown in a dumping position.

As illustrated in FIGS. 1 and 2, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum). A front left seat 14 and a front right seat 16 (shown in FIG. 1) can each be supported by the vehicular frame 12 and can facilitate support of occupants within the vehicle's passenger compartment 18. The utility vehicle 10 can also include a utility bed 20 which is coupled with the vehicular frame 12, either directly or indirectly, and such as through use of a hinge assembly 22 (FIG. 2). The hinge assembly 22 can facilitate pivotable movement of the utility bed 20 with respect to the vehicular frame 12 of the utility vehicle 10, and between a hauling position (shown in FIG. 1) and a dumping position (shown in FIG. 2). As illustrated in FIG. 2, the utility bed 20 can include a bed frame 23. The hinge assembly 22 can be coupled with the bed frame 23. When the utility bed 20 is in the hauling position, the utility bed 20 can rest upon a rest structure 24 provided behind the front seats 14, 16. In one embodiment, the rest structure 24 can be rigid (e.g., formed from sheet metal), though in another embodiment, the rest structure 24 can include a resilient element (e.g., a rubber bumper). It will be appreciated that any of a variety of known conventional mechanisms or methods (none shown) can be provided to facilitate manual or powered movement of the utility bed 20 between the hauling and dumping positions under control of an operator of the utility vehicle 10.

In the embodiment of FIGS. 1-11, the utility bed 20 is shown to comprise a bed floor 26. The utility bed 20 is also shown to include a left sidewall 28 and a right sidewall 30 extending generally perpendicularly from the bed floor 26 or locations adjacent to the bed floor 26. The utility bed 20 can also include end walls such as a front wall 32 and a tailgate 34, as illustrated in FIGS. 1 and 3-7. In one embodiment, the tailgate 34 can be pivotally coupled with the bed floor 26. When the utility bed 20 is in the hauling position (shown in FIGS. 1 and 3), it will be appreciated that the left sidewall 28, the right sidewall 30, and the front wall 32 can cooperate with the bed floor 26 to retain cargo within the utility bed 20. The tailgate 34, when closed (as shown in FIGS. 1-6), can also cooperate with the bed floor 26, the left sidewall 28, and the right sidewall 30 to retain cargo within the utility bed 20. It will be appreciated that the tailgate 34 can be selectively opened to facilitate loading of the utility bed 20 and/or to allow cargo (e.g., dirt) to pour from the utility bed 20 when the utility bed 20 is in a dumping position (shown in FIG. 2). In another embodiment, it will be appreciated that a rear wall can be provided in lieu of a tailgate with the rear wall being rigidly affixed with respect to a bed floor of a utility bed such that it might not be capable of being selectively opened by an operator. In yet another alternative embodiment, it will be appreciated that one or more sidewalls (e.g., 28 and/or 30) of a utility bed might be capable of being selectively opened (e.g., like tailgate 34) by an operator. In still another alternative embodiment, it will be appreciated that a utility bed might not include any tailgate and/or sidewalls and might, for example, comprise a flat-bed type configuration (e.g., commonly used for hauling small vehicles).

Figure 3:
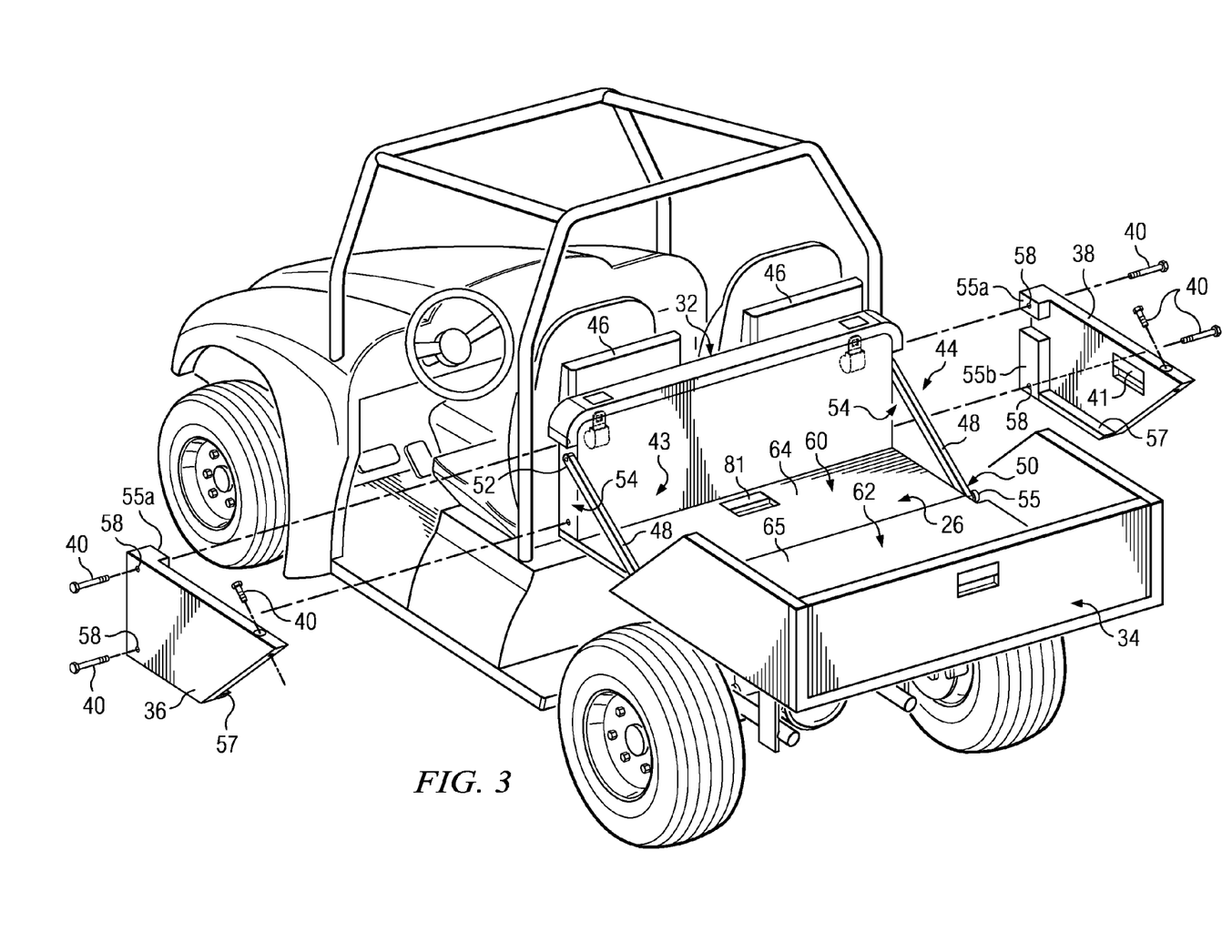
FIG. 3 is a left rear perspective view of the vehicle of FIG. 1, wherein the utility bed is shown in a hauling position with a front wall in a cargo hauling position, with a front floor portion of a bed floor in a cargo support position, and with left and right doors removed.

The left and right sidewalls 28, 30 can include respective left and right doors 36, 38. In one embodiment, as illustrated in FIG. 3, the left and right doors 36, 38 can be releasably attached to the front wall 32 and adjacent portions of the respective left and right sidewalls 28, 30 with bolts 40. The left and right doors 36, 38 can accordingly be selectively removed from the utility vehicle 10. The left and right doors 36, 38 can each include a handle (e.g., 41) that can accommodate a user's hand for more effective removal and installation of the left and right doors 36, 38 from/to the utility vehicle 10. When the left and right doors 36, 38 are installed on the utility vehicle 10, each of the left and right doors 36, 38 can cooperate with the bed floor 26, adjacent portions of the left and right sidewalls 28, 30, the front wall 32, and the tailgate 34 to retain cargo within the utility bed 20. When the left and right doors 36, 38 are removed, left and right openings 43, 44 can be defined, as illustrated in FIG. 3. In other embodiments, the left and right doors 36, 38 can be pivotally attached to adjacent portions of the respective left and right sidewalls 28, 30, to the front wall 32, or to the bed floor 26. In these other embodiments, each of the left and right doors 36, 38 can be pivoted between opened and closed positions. It will be appreciated that left and right doors can be movably attached with adjacent portions of left and right sidewalls (e.g., 28, 30) in any of a variety of suitable alternative arrangements. In one embodiment, a seal can be provided along the perimeter of each of the left and right doors 36, 38. Each seal can facilitate selective sealing of the interaction between the door (e.g., 36, 38) and the adjacent portion of the sidewall (e.g., 28, 30).

Figure 4:
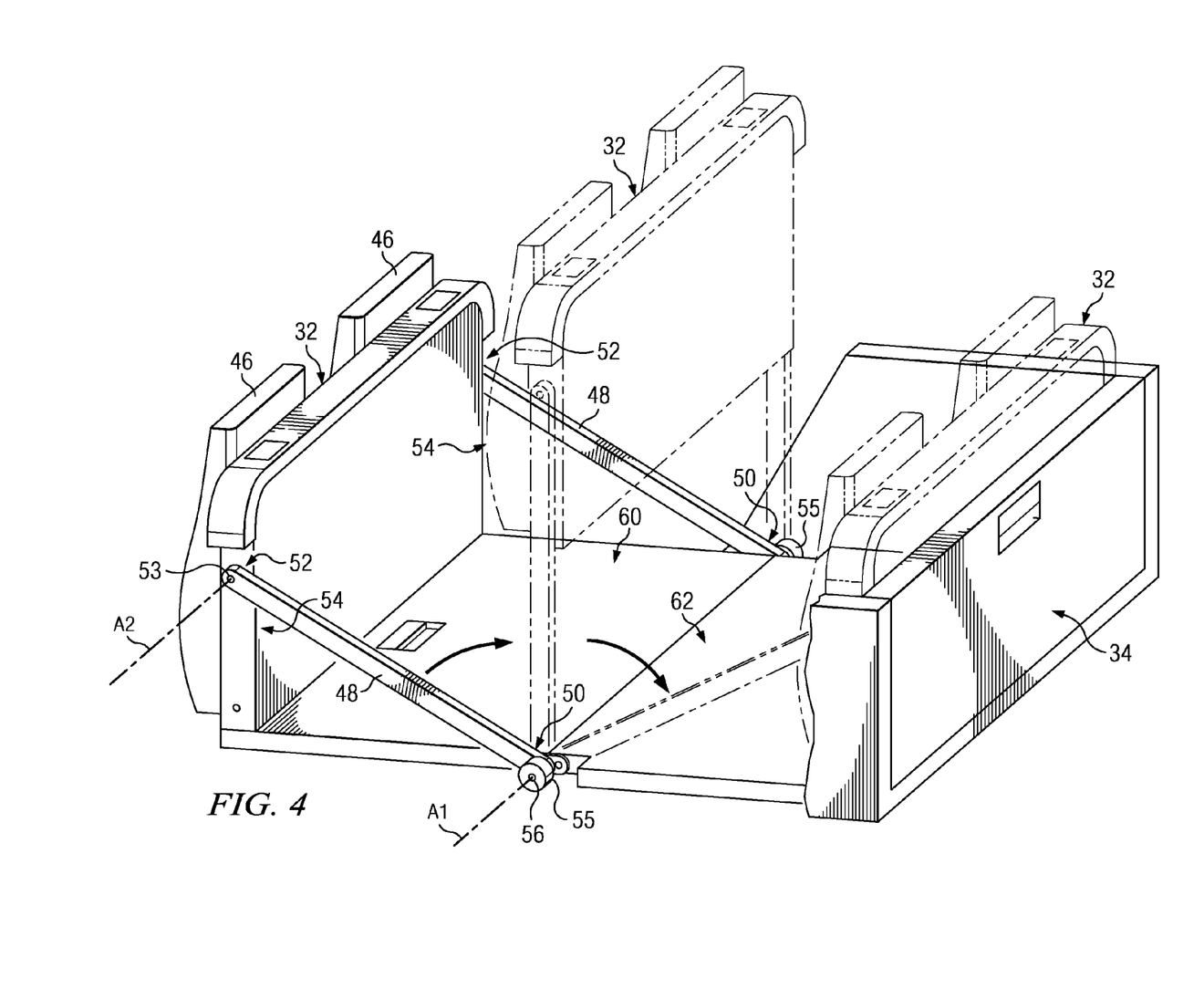
FIG. 4 is a left rear perspective view depicting the utility bed of the vehicle of FIG. 1 with certain components removed for clarity of illustration, wherein the front wall of the utility bed is shown in solid lines in the cargo hauling position and in dashed lines moving from the cargo hauling position to a seating position.
Figure 5:
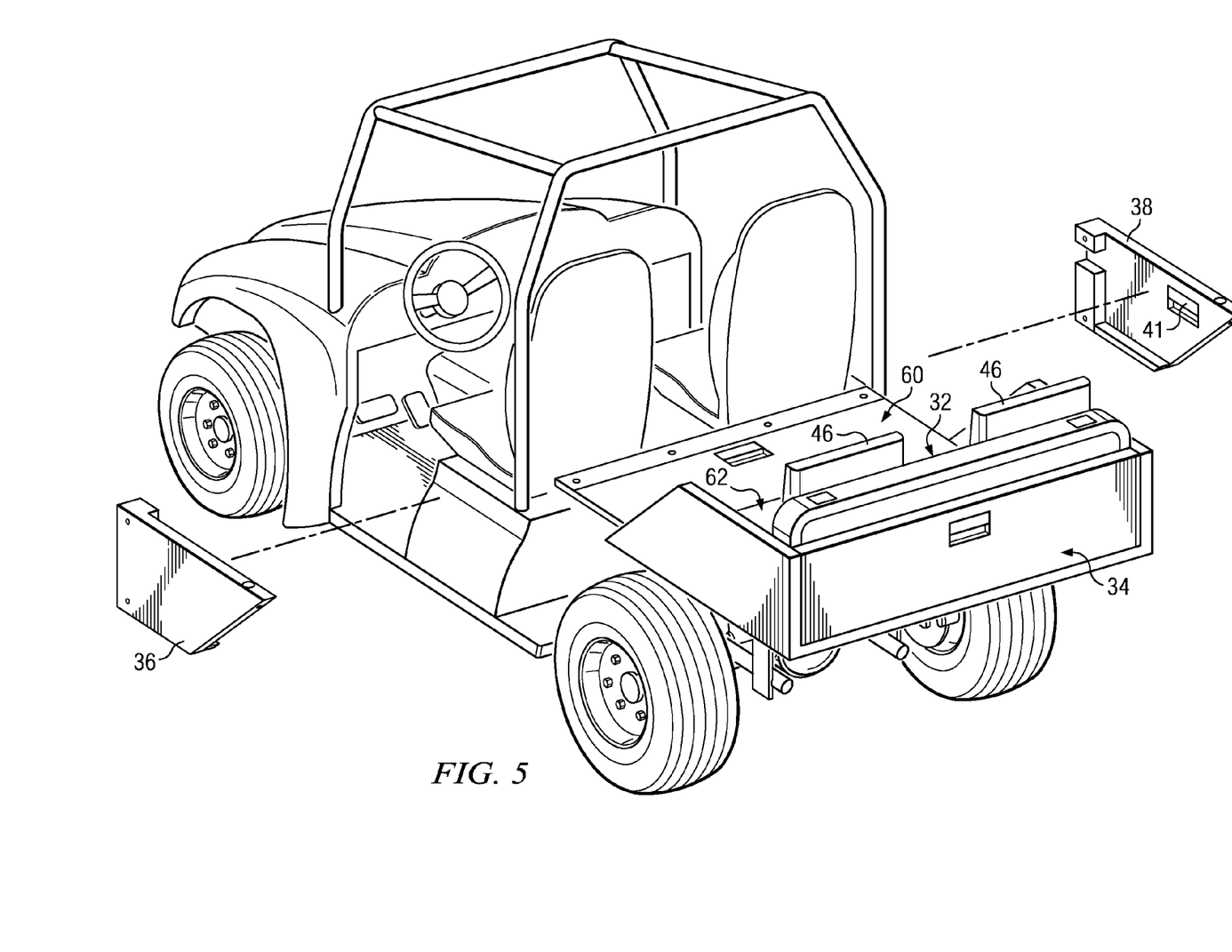
FIG. 5 is a left rear perspective view similar to FIG. 3 but with the front wall in the seating position.

As illustrated in FIGS. 3-5, the front wall 32 can be movable with respect to the bed floor 26 between a cargo hauling position (FIG. 3) and a seating position (FIG. 5). When in the cargo hauling position, the front wall 32 can be disposed at a front of the utility bed 20 such that it cooperates with the bed floor 26 and the left and right sidewalls 28, 30 (e.g., the left and right doors 36, 38) to retain cargo within the utility bed 20. When in the seating position, the front wall 32 can be disposed at a rear of the utility bed 20 and forwardly of the tailgate 34.

A pair of seat backs 46 can be coupled with the front wall 32. As will be described in further detail below, the front wall 32 can be moved from the cargo hauling position to the seating position to deploy the seat backs 46 for a rear seat. When the front wall 32 is in the cargo hauling position, the seat backs 46 can be located in front of the front wall 32 and behind the front seats 14, 16 (e.g., interposed between the front wall 32 and the front seats 14, 16). When the front wall 32 is moved to the seating position, the seat backs 46 can still face forwardly but are instead spaced further from the front seats 14, 16 than when the front wall 32 is in the cargo hauling position.

The utility bed 20 can include a pair of carrier arms 48 that facilitate movement of the front wall 32 between the cargo hauling position and the seating position. As illustrated in FIGS. 3 and 4, each of the carrier arms 48 can include a first end 50 and a second end 52. The first end 50 of the carrier arms 48 can be pivotally coupled with the bed frame 23 such that the carrier arms 48 are pivotable with respect to the bed frame 23 about an axis A1 (FIG. 4). The second ends 52 of the carrier arms 48 can be pivotally coupled with the front wall 32 such that the front wall 32 is pivotable with respect to the carrier arms 48 about an axis A2 (e.g., a wall axis) (FIG. 4).

The carrier arms 48 can thus facilitate guided movement of the front wall 32 between the cargo hauling position and the seating position. For example, as the front wall 32 moves between the cargo hauling position and the seating position, the carrier arms 48 rotate about the axis A1. The front wall 32 can simultaneously pivot with respect to the carrier arms 48 to keep the front wall 32 upright with the seat backs 46 facing forwardly. In an alternative arrangement, however, the front wall 32 might be rigidly attached to the second ends 52 of the carrier arms 48 such that the front wall 32 does not pivot with respect to the carrier arms 48 and is thus provided in an upside-down arrangement when in the seating position. In such an arrangement, seat backs (e.g., 46) coupled with the front wall 32 can be arranged such that they are located along an interior of the utility bed 20 when the front wall 32 is in the cargo hauling position (e.g., seat backs are rearwardly of the front wall 32 when the front wall 32 is in the cargo hauling position).

In one embodiment, as illustrated in FIG. 4, the second ends 52 of the carrier arms 48 can be pivotally coupled with the front wall 32 with pins (e.g., 53). In one embodiment, the pins can comprise detent pins. In such an embodiment, the front wall 32 can include bearings (not shown) that each define a central opening configured to receive the detent pin. Each detent pin can be provided through one of the carrier arms 48 and inserted into a respective bearing in an interference fit arrangement. The detent pins can be peened into the carrier arms 48 to secure the detent pins to the carrier arms 48.

In one embodiment, as illustrated in FIGS. 3 and 4, the first end 50 of the carrier arms 48 can be pivotally coupled with the left and right sidewalls 28, 30 with bearings 55. In such an embodiment, each bearing 55 can be coupled with one of the left and right sidewalls 28, 30. Pins (e.g., 56) can couple the first ends 50 of the carrier aims 48 with the bearings 55 in a manner similar to that described above with respect to the second ends 52 and the front wall 32 (e.g., with pin 53). It will be appreciated that carrier arms can be pivotally coupled with a bed frame in any of a variety of suitable arrangements and/or locations, such as pivotally attached directly to the bed frame 23 or pivotally attached to the bed floor 26, for example.

The carrier arms 48 can comprise flat bars, as shown in FIGS. 1 and 3-4, such as can be formed from metal (e.g., stamp formed steel or cast iron). It will be appreciated, however, that any of a variety of suitable alternative carrier arm arrangements can be provided, such as a carbon fiber elongate rod. In some embodiments, the carrier arms 48 can be automated-type arms that would facilitate movement of the front wall 32 through actuation of a pushbutton or lever, for example, and in other embodiments the carrier arms 48 can be non-automated such that the front wall 32 is manually movable. In some embodiments, the carrier arms 48 can be configured to support the entire weight of the front wall 32 during movement between the cargo hauling and seating positions. In these embodiments, during movement of the front wall 32 between the cargo hauling and seating positions, the weight of the front wall 32 can be substantially borne by the carrier arms 48 which can facilitate more effective manual movement of the front wall 32 (e.g., by a user).

In one embodiment, as illustrated in FIG. 3, the front wall 32 can define notched areas 54 adjacent to the carrier arms 48. The notched areas 54 can permit the carrier arms 48 to pivot and move alongside the front wall 32 during movement of the front wall 32 between the cargo hauling position and the seating position. The left and right doors 36, 38 can each include an upper flange 55a and a lower flange 55b that fits into the respective notched area 54 of the front wall 32 when the left and right doors 36, 38 are installed. The upper and lower flanges 55a, 55b of each left and right door 36, 38 can cooperate with the front wall 32 and can surround the second end 52 of each carrier arm 48 to give the appearance of a substantially continuous front wall 32. The upper and lower flanges 55a and 55b can also define passageways 58 (FIG. 3) that allow passage of the bolts 40 for securing the left and right doors 36, 38 with the front wall 32. Each of the left and right doors 36, 38 can also include a lower horizontal flange 56 that interacts with the bed floor 26 forwardly of the first end 50 of the carrier arms 48 to give the appearance of a substantially continuous bed floor 26.

Figure 7:
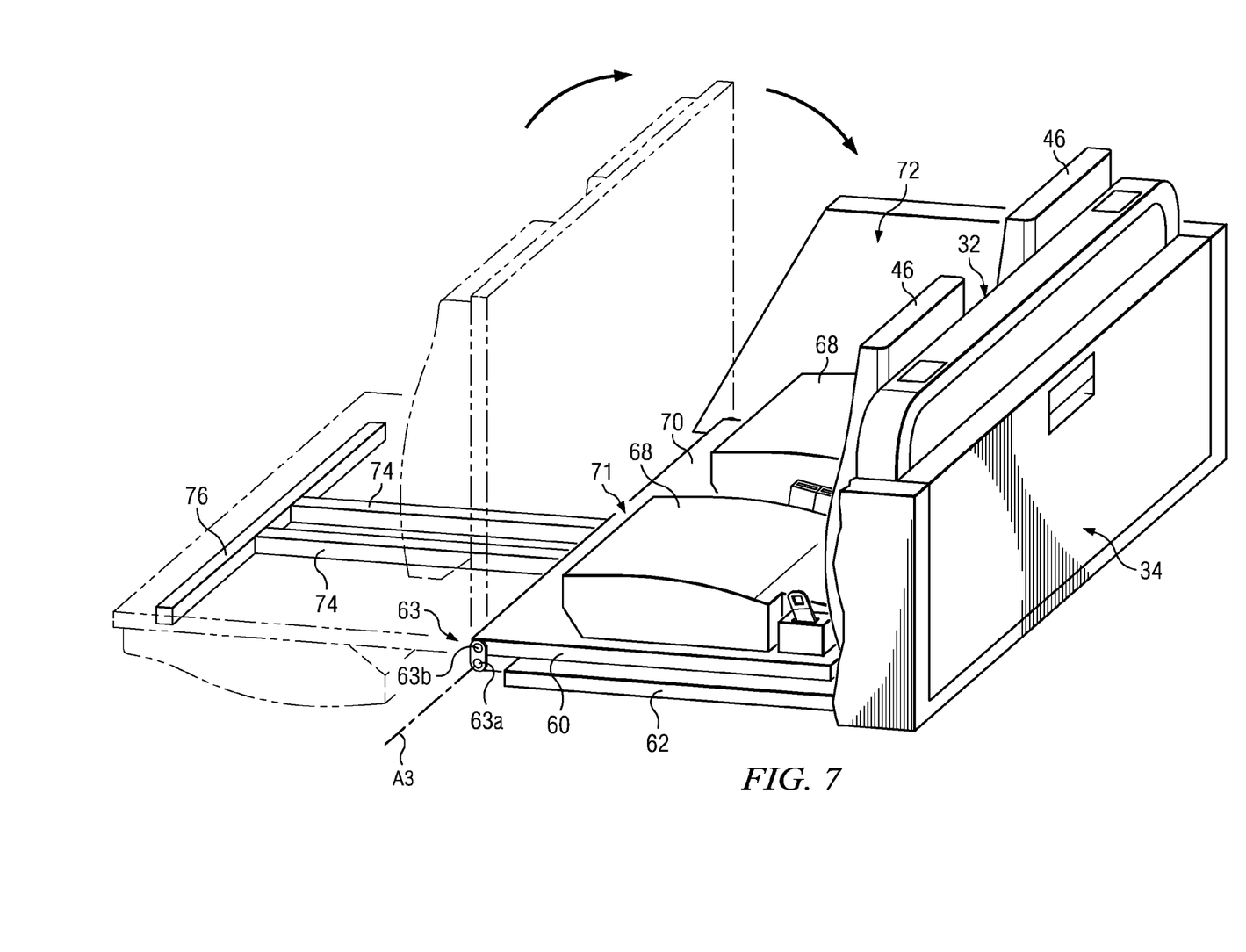
FIG. 7 is a left rear perspective view of the utility bed of the vehicle of FIG. 1 with the front wall in the seating position and with certain components removed for clarity of illustration, wherein the front floor portion is shown in solid lines in the cargo support position and in dashed lines moving from the cargo support position to the seating position.

As illustrated in FIGS. 1 and 3-4, the bed floor 26 can comprise a front floor portion 60 and a rear floor portion 62. The front floor portion 60 can be pivotally coupled with the rear floor portion 62 such that the front floor portion 60 is pivotable with respect to the rear floor portion 62 about an axis A3 (FIG. 7). In one embodiment, as illustrated in FIG. 7, the front floor portion 60 can be pivotally coupled to the rear floor portion 62 with a hinge assembly 63 that includes a first pin 63a and a second pin 63b. The carrier arms 48 can be pivotally coupled with the left and right sidewalls 28, 30 adjacent the first pin 63a and the axes A2 and A3 can be parallel. In an alternative embodiment, carrier arms can be pivotally coupled sidewalls such that the axes A2 and A3 are coaxial.

Figure 6:
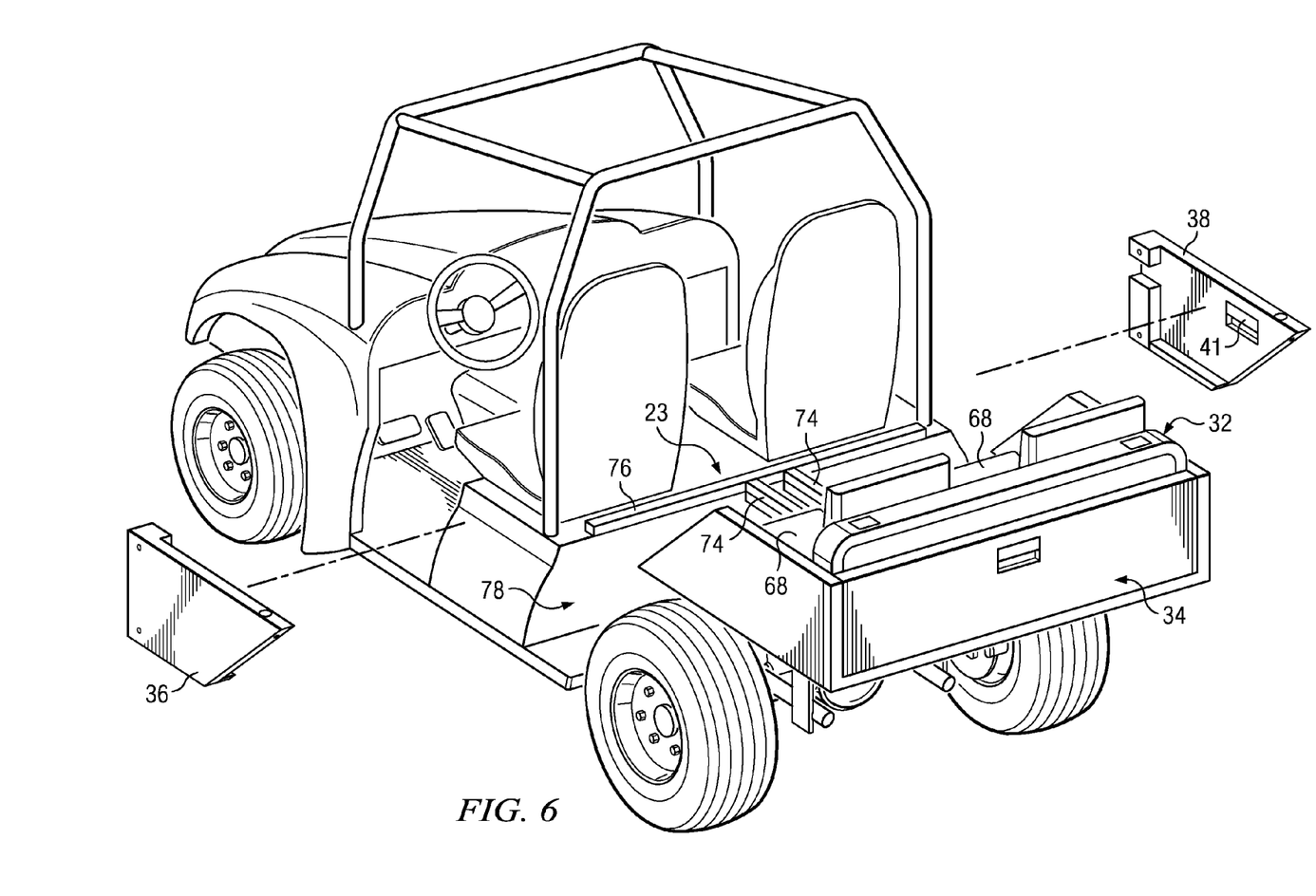
FIG. 6 is a left rear perspective view similar to FIG. 5 but with the front floor portion in a seating position.

The front floor portion 60 can accordingly pivot with respect to the rear floor portion 62 between a cargo support position (FIGS. 1 and 3-5) and a seating position (FIG. 6). As illustrated in FIG. 1, when the front floor portion 60 is in the cargo support position, a first surface 64 of the front floor portion 60 and a second floor surface 65 of the rear floor portion 62 can cooperate to define a substantially coplanar support surface that is configured to directly contact and provide underlying support for cargo (not shown) disposed within the utility bed 20. It will be appreciated, that a front floor portion can be movably coupled with a rear floor portion in any of a variety of suitable alternative arrangements. For example, the front floor portion 60 can be pivotally attached to the bed frame 23. In another example, a front floor portion can be removable from the utility bed to facilitate manual positioning of the front floor in the cargo support position or seating position. In one embodiment, the rear floor portion 62 can be rigidly secured to the bed frame 23. In another embodiment, the rear floor portion 62 can be pivotally attached to the bed frame 23 to facilitate selective access to the area underlying the utility bed 20 (e.g., to facilitating access to the vehicular frame 12).

Figures 8, 9:
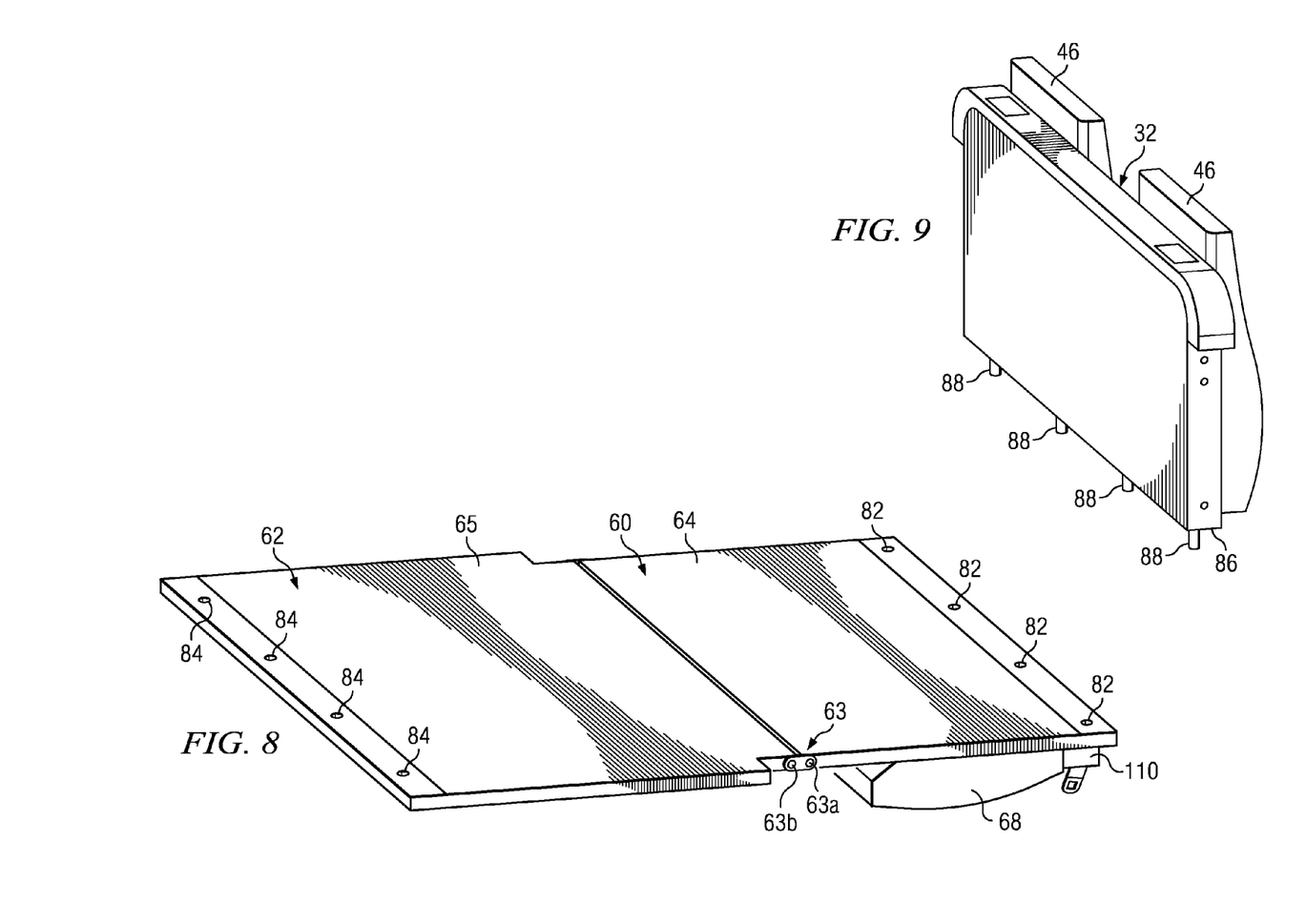
FIG. 8 is a right perspective view depicting the bed floor of the utility bed of FIG. 1 with certain components of the utility bed removed for clarity of illustration.
FIG. 9 is a right perspective view depicting the front wall of the utility bed of FIG. 1 with certain components of the utility bed removed for clarity of illustration.

As illustrated in FIGS. 6-8, a pair of seat bottoms 68 can be coupled with the front floor portion 60. In particular, the seat bottoms 68 can be coupled with a bottom surface 70 (FIG. 7) of the front floor portion 60 such that the seat bottoms 68 reside underneath the utility bed 20 (e.g., as illustrated in FIG. 2) and are thus somewhat obscured from plain sight when the front floor portion 60 is in the cargo support position. When the front floor portion 60 is in the seating position, as illustrated in FIG. 7, the front floor portion 60 can rest upon the rear floor portion 62 (e.g., with the first and second surfaces 64, 65 contacting each other) such that the seat bottoms 68 are positioned on top of the front floor portion 60.

Accordingly, the front wall 32 and the front floor portion 60 can each be moved to their seating positions to convert the utility bed 20 into left and right rear seats 71, 72 for the utility vehicle 10. The left and right doors 36, 38 can be removed (or otherwise opened) to reveal the respective openings 43, 44 that can facilitate the ingress/egress of a passenger to/from the left and right rear seats 71, 72.

As illustrated in FIG. 6, the bed frame 23 can include spine members 74 that can be attached to a front lateral member 76. When the utility bed 20 is in the hauling position, as illustrated in FIG. 1, the lateral member 76 can rest upon the rest structure 24 behind the front seats 14, 16. When the front floor portion 60 is in the cargo support position, the spine members 74 and the lateral member 76 can cooperate to provide underlying support for the front floor portion 60. In one embodiment, the spine members 74 can be interposed between the seat backs 46 and contacting the front wall 32 when the front wall 32 is in the cargo hauling position.

The bed frame 23 can include any of a variety of structural and/or decorative rails, panels, and/or other components which are typically, although not necessarily, formed from metal (e.g., steel and/or aluminum). In one embodiment, the front and/or rear floor portions 60, 62 of the utility bed 20 can be formed as a unibody construction such that the bed frame 23 is integrally formed with the front and/or rear floor portions 60, 62.

The spine members 74 and the lateral member 76 of the bed frame 23 can be provided in a T-shaped configuration, as illustrated in FIGS. 2, and 6-7. The spine members 74 and the lateral member 76 can thus cooperate to facilitate effective passenger ingress and egress to and from the left and right rear seats 71, 72. For example, when the left and right rear seats 71, 72 are deployed, as illustrated in FIG. 6, a foot well 78 is provided between the rest structure 24 and the rear seats 71, 72. The T-shaped configuration of the spine members 74 and lateral member 76 can provide access to the footwell 78 that might otherwise be obstructed by a conventional utility bed frame. For example, a conventional utility bed frame might extend along the entire circumference of the utility bed 20 and obstruct passenger access to the foot well (e.g., 78) when the left and right rear seats 71, 72 are deployed. Such a conventional utility bed frame might require a passenger to climb over the bed frame when embarking or disembarking to/from the rear seats 71, 72.

As illustrated in FIGS. 1 and 3, the front floor portion 60 can include a latch 81 that facilitates selective securement of the front floor portion 60 to the bed frame 23. Alternatively, the front floor portion 60 can be selectively retained to the bed frame 23 with any of a variety of other suitable releasable fasteners and/or mechanism(s). It will be appreciated that any of a variety of known conventional mechanisms or methods (none shown) can be provided to facilitate manual or powered movement of the front floor portion 60 between the cargo support position and the seating position. For example, the front floor portion 60 can include a selectively concealable handle (not shown). In another embodiment, an electronic linear actuator can be associated with the front floor portion 60 and the bed frame 23.

Although the front floor portion 60 is shown to be attached directly to the rear floor portion 62, it will be appreciated that a front floor portion can be movably coupled with a bed frame in any of a variety of suitable alternative arrangements. For example, a front floor portion can be pivotally attached directly to the bed frame 23. In another example, the front floor portion can be releasably coupled with the rear floor portion and/or a bed frame (e.g., with latches) such that the front floor portion can be detached from the utility bed and manually moved into a seating position (e.g., by a passenger).

As illustrated in FIG. 8, the first surface 64 of the front floor portion 60 can define a plurality of first apertures 82 and the second surface 65 of the rear floor portion 62 can define a plurality of second apertures 84. As illustrated in FIG. 9, the front wall 32 can define a bottom surface 86 and can include a plurality of pins 88 that extend from the bottom surface 86. Each of the plurality of first apertures 82 and the plurality of second apertures 84 can correspond with one of the pins 88. When the front wall 32 is in the cargo hauling position, the front wall 32 can rest upon the front floor portion 60 such that the first surface 64 of the front floor portion 60 contacts the bottom surface 86 of the front wall 32. The pins 88 can extend into the plurality of first apertures 82 to prevent the front wall 32 from inadvertently sliding with respect to the front floor portion 60. When the front wall 32 is in the seating position, the front wall 32 can rest upon the rear floor portion 62 such that the second surface 65 of the rear floor portion 62 contacts the bottom surface 86 of the front wall 32. The pins 88 can extend into the plurality of second apertures 84 to prevent the front wall 32 from inadvertently sliding with respect to the rear floor portion 62.

Figure 10:
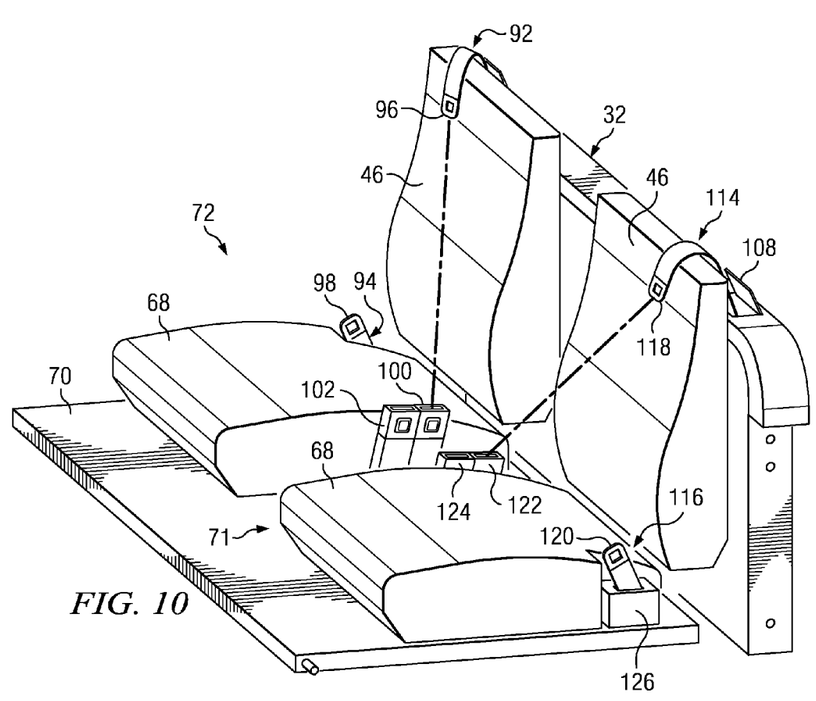
FIG. 10 is a perspective view depicting the front wall and the front floor portion in respective seating positions and cooperating to provide a rear seat, and further depicting left and right seat belt assemblies.
Figure 11:
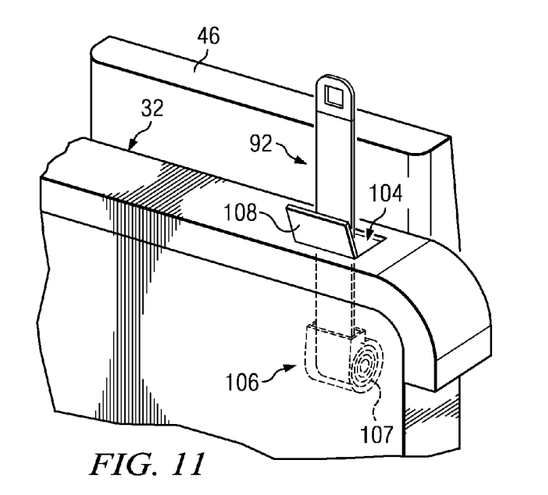
FIG. 11 is an enlarged view depicting a shoulder belt and a shoulder belt retractor of the right seat belt assembly of FIG. 10.

The utility bed 20 can include left and right seat belt assemblies that facilitate selective restraint of passengers seated on the left and right rear seats 71, 72. As illustrated in FIG. 10, the right seat belt assembly can include a shoulder belt 92 and a lap belt 94. The shoulder belt 92 and the lap belt 94 can include respective buckles 96, 98 that can be releasably engaged with respective clasps 100, 102. As illustrated in FIGS. 10 and 11, the front wall 32 can define a receptacle 104 adjacent to the seat back 46 of the right seat 72. A shoulder belt retractor 106 can be disposed within the receptacle 104 and coupled to the front wall 32 (e.g., through welding). The shoulder belt retractor 106 can be configured to facilitate selective dispensation and retraction of the shoulder belt 92 from/to the receptacle 104. In one embodiment, as illustrated in FIG. 11, the shoulder belt retractor 106 can include a spool 107. The shoulder belt 92 can be attached to the spool 107 which can rotate to facilitate collection and dispensation of the shoulder belt 92. The shoulder belt retractor 106 can be disposed entirely within the receptacle 104 such that, when the shoulder belt 92 is completely retracted (e.g., fully collected onto the spool 107), the shoulder belt 92 and the buckle 96 can also be disposed entirely within the receptacle 104. A lid 108 can overlie the receptacle 104 to entirely conceal the shoulder belt 92, the buckle 96, and the shoulder belt retractor 106 within the front wall 32. In one embodiment, the lid 108 can be pivotally coupled to the front wall 32 and biased into a closed position (e.g., with a spring). The lid 108 can be opened (e.g., manually or with a pushbutton) to allow a user to grasp the buckle 96 and withdraw the shoulder belt 92 from the receptacle 104. Once the shoulder belt 92 is withdrawn from the receptacle 104, the shoulder belt 92 can be routed over a shoulder of a passenger seated on the right rear seat 72 and the buckle 96 can be engaged with the clasp 100. When the buckle 96 is disengaged from the clasp 100, the shoulder belt retractor 106 can retract the shoulder belt 92 into the receptacle 104. Once the shoulder belt 92 is completely retracted into the receptacle 104, the lid 108 can be closed (e.g., manually or automatically) to conceal the shoulder belt 92, the buckle 96, and the shoulder belt retractor 106 within the front wall 32.

In one embodiment, a hook (not shown) can be provided within the receptacle 104 to facilitate effective storage of the buckle 96 within the receptacle 104. The hook can maintain the buckle 96 at a position that permits effective grasping of the buckle 96 by an occupant (e.g., in order to pull the shoulder belt 92 from the receptacle 104). It will be appreciated, however, that any of a variety of other suitable alternative features can be provided for maintaining the buckle 96 in a position that permits an occupant to effectively grasp the buckle 96.

The right seat belt assembly can also include a lap belt retractor 110 (shown in FIG. 8) associated with the lap belt 94. The lap belt retractor 110 can be coupled to the bottom surface 70 of the front floor portion 60 (e.g., with bolts) adjacent to the seat bottom 68 of the right seat 72. The lap belt retractor 110 can facilitate selective dispensation and collection of the lap belt 94. Accordingly, the lap belt 94 can be dispensed from the lap belt retractor 110, routed over a lap of a passenger seated on the right rear seat 72, and the buckle 98 can be engaged with the clasp 102.

The left seat belt assembly can facilitate selective restraint of a passenger seated on the left rear seat 71. The left seat belt assembly can be similar in many respects to the right seat belt assembly. For example, the left seat belt assembly can include a shoulder belt 114 and a lap belt 116. The shoulder belt 114 and the lap belt 116 can include respective buckles 118, 120 that can be releasably engaged with respective clasps 122, 124. A shoulder belt retractor (e.g., 125 in FIG. 1) can be disposed within a receptacle located on the left side of the front wall 32 adjacent to the seat back 46 of the left rear seat 71. As illustrated in FIG. 10, the left seat belt assembly can also include a lap belt retractor 126 coupled to the bottom surface 70 of the front floor portion 60 adjacent to the seat bottom 68 of the left seat 71. Although the lap belt retractor 126 is shown to rest on top of the bottom surface 70 of the front floor portion 60, it will be appreciated that a lap belt retractor can be disposed in a receptacle defined by the front floor portion 60 similar to the shoulder belt retractor 106.

The shoulder belt 114 can be withdrawn from the receptacle and routed over a shoulder of a passenger seated on the left rear seat 71 and the buckle 118 can be engaged with the clasp 122. The lap belt 116 can be dispensed from the lap belt retractor 126, routed over the lap of a passenger seated on the left rear seat 71, and the buckle 120 can be engaged with the clasp 124. When the buckle 118 of the shoulder belt 114 is disengaged from the clasp 122, the shoulder belt retractor can retract the shoulder belt 114 into the receptacle. Similarly, when the buckle 120 of the lap belt 116 is disengaged from the clasp 124, the lap belt retractor 126 can retract the lap belt 114 towards the lap belt retractor 126.

While the relative movement of the front wall 32, the left and right doors 36, 38, and the front floor portion 60 is shown in FIGS. 1-7, to be sequential, a utility bed can alternatively be provided that allows the front wall 32, the left and right doors 36, 38, and the front floor portion 60 to be moved independent of one another. In one embodiment, the front wall 32 and/or the front floor portion 60 can be moved manually. In another embodiment, the front wall 32 and/or the front floor portion 60 can be moved automatically, such as by actuating a pushbutton. In such an embodiment, each of the front wall 32 and/or the front floor portion 60 can be moved with motorized actuators.

It will be appreciated, that although the embodiment of FIGS. 1-11 illustrates forward facing rear seats 71, 72 which are disposed towards a rearmost portion of the utility bed 20, rear seats can be provided on a utility bed in any of a variety of suitable alternative arrangements. In one embodiment, the rear wall and the rear floor portion can be configured to provide rearward facing seats disposed at a frontmost portion of the utility bed. The rear wall of the utility bed can include seat backs and can be movable via carrier arms between a cargo hauling position and a seating position. When in the seating position, the rear wall can be located at a frontmost portion of the utility bed and rearwardly of a front wall. A rear floor portion of the utility bed can include seat bottoms and can be pivotable with respect to a front floor portion between a cargo hauling position and a seating position. When in the seating position, the rear floor portion can lie on top of the front floor portion. When the rear wall and rear floor portion are in their seating positions the seat backs can cooperate with the seat bottoms to define rearwardly facing left and right rear seats. In such an embodiment, the left and right sidewalls may or may not include respective left and right side doors since the rear seats can be accessed from the rear of the vehicle.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A utility bed comprising:
    a bed frame;
    a bed floor comprising a first floor portion and a second floor portion, the first floor portion being movably coupled with the bed frame and movable with respect to the bed frame between a cargo support position and a seating position;
    a pair of carrier arms, each carrier arm comprising a first end and a second end, the first end of each carrier arm being pivotally coupled with the bed frame such that the carrier arms are pivotable with respect to the bed frame about a first axis;
    an end wall coupled with the second end of each carrier arm;
    a seat bottom coupled with the first floor portion; and
    a seat back coupled with the end wall; wherein:
        the pair of carrier arms facilitates movement of the end wall between a cargo hauling position, in which the end wall rests upon the first floor portion, and a seating position, in which the end wall rests upon the second floor portion; and
        when the first floor portion and the end wall are in their respective seating positions, the seat back and the seat bottom cooperate to provide a rear seat.

2. The utility bed of claim 1 wherein the first floor portion is pivotally coupled with the second floor portion such that the first floor portion is pivotable with respect to the second floor portion about a second axis.

3. The utility bed of claim 2 wherein the first axis and the second axis are substantially parallel with one another.

4. The utility bed of claim 1 wherein the end wall is pivotally coupled with the second end of each carrier arm and is pivotable with respect to the pair of carrier arms about a wall axis.

5. The utility bed of claim 1 further comprising a seat belt assembly coupled with the end wall.

6. The utility bed of claim 5 wherein the end wall defines a receptacle adjacent to the seat back and the seat belt assembly comprises a retractor and a seat belt, the retractor being disposed within the receptacle and configured to facilitate selective dispensation of the seat belt from the receptacle.

7. The utility bed of claim 1 wherein the first floor portion comprises a front floor portion, the second floor portion comprises a rear floor portion, and the end wall comprises a front wall.

8. The utility bed of claim 7 wherein the front wall defines a bottom surface, the front floor portion defines a front floor portion surface, the rear floor portion defines a rear floor portion surface, and the bottom surface of the front wall contacts one of the front floor portion surface and the rear floor portion surface when the front wall is in one of the cargo hauling position and the seating position, respectively.

9. The utility bed of claim 8 wherein the front floor portion surface defines a plurality of front apertures, the rear floor portion surface defines a plurality of rear apertures, the front wall includes a plurality of pins that extend from the bottom surface, the pins extend into the plurality of front apertures when the front wall is in the cargo hauling position, and the pins extend into the plurality of rear apertures when the front wall is the seating position.

10. A vehicle comprising:
a vehicular frame;
a front seat coupled with the vehicular frame; and
a utility bed coupled with the vehicular frame and comprising:
a bed frame;
a bed floor comprising a first floor portion and a second floor portion, the first floor portion being movably coupled with the bed frame and movable with respect to the bed frame between a cargo support position and a seating position;
a pair of carrier arms, each carrier arm comprising a first end and a second end, the first end of each carrier arm being pivotally coupled with the bed frame such that the carrier arms are pivotable with respect to the bed frame about a first axis;
an end wall coupled with the second end of each carrier arm;
a seat bottom coupled with the first floor portion; and
a seat back coupled with the end wall; wherein:
the pair of carrier arms facilitates movement of the end wall between a cargo hauling position, in which the end wall rests upon the first floor portion, and a seating position, in which the end wall rests upon the second floor portion; and
when the first floor portion and the end wall are in their respective seating positions, the seat back and the seat bottom cooperate to provide a rear seat.

11. The vehicle of claim 10 wherein the first floor portion is pivotally coupled with the second floor portion such that the first floor portion is pivotable with respect to the second floor portion about a second axis.

12. The vehicle of claim 11 wherein the first axis and the second axis are substantially parallel with one another.

13. The vehicle of claim 10 wherein the end wall is pivotally coupled with the second end of each carrier arm and is pivotable with respect to the pair of carrier arms about a wall axis.

14. The vehicle of claim 10 wherein the end wall comprises a front wall and the utility bed further comprises a tailgate, wherein the front wall is interposed between the front seat and the tailgate when the front wall is in each of the cargo hauling position and the seating position.

15. The vehicle of claim 10 wherein the seat back faces forwardly when the front wall is in each of the cargo hauling position and the seating position.

16. The vehicle of claim 10 wherein the first floor portion comprises a front floor portion, the second floor portion comprises a rear floor portion, and the end wall comprises a front wall.

17. The vehicle of claim 10 wherein the utility bed further comprises a sidewall that comprises a door.

18. The vehicle of claim 10 wherein the seat bottom is beneath the first floor portion when the first floor portion is in the cargo support position.

19. A vehicle comprising:
a vehicular frame;
a front seat coupled with the vehicular frame; and
a utility bed coupled with the vehicular frame and comprising:
a bed frame;
a bed floor comprising a front floor portion and a rear floor portion, the front floor portion being pivotally coupled with the rear floor portion and pivotable with respect to the rear floor portion about a first axis between a cargo support position and a seating position;
a pair of carrier arms, each carrier arm comprising a first end and a second end, the first end of each carrier arm being pivotally coupled with the bed frame such that the carrier arms are pivotable with respect to the bed frame about a second axis;
a front wall defining a receptacle and pivotally coupled with the second end of each carrier arm, the front wall being pivotable with respect to the pair of carrier arms about a third axis;
a seat bottom coupled with the front floor portion;
a seat back coupled with the front wall adjacent the receptacle;
a seat belt assembly comprising a retractor and a seat belt, the retractor being disposed within the receptacle and configured to facilitate selective dispensation of the seat belt from the receptacle; wherein:
the pair of carrier arms facilitates movement of the front wall between a cargo hauling position, in which the front wall rests upon the front floor portion, and a seating position, in which the front wall rests upon the rear floor portion;
the first axis and the second axis are substantially parallel with one another;
when the front floor portion and the front wall are in their respective seating positions, the seat back and the seat bottom cooperate to provide a forward facing rear seat.

20. The vehicle of claim 19 wherein the front wall defines a bottom surface, the front floor portion defines a front floor portion surface, the rear floor portion defines a rear floor portion surface, the front floor portion surface defines a plurality of front apertures, the rear floor portion surface defines a plurality of rear apertures, the front wall includes a plurality of pins that extend from the bottom surface, the pins extend into the plurality of front apertures when the wall is in the cargo hauling position, and the pins extend into the plurality of rear apertures when the front wall is the seating position.

* * * * *

UNITED STATES PATENT AND TRADEMARK OFFICE
CERTIFICATE OF CORRECTION

PATENT NO. : 8,348,322 B2
APPLICATION NO. : 13/017565
DATED : January 8, 2013
INVENTOR(S) : King It is certified that error appears in the above-identified patent and that said Letters Patent is hereby corrected as shown below:

Column 1, line 37, change "scat" to --seat--;
Column 1, line 40, change "scat" to --seat--; and
Column 5, line 34, change "aims" to --arms--.

Signed and Sealed this
Second Day of April, 2013

Teresa Stanek Rea
*Acting Director of the United States Patent and Trademark Office*